United States Patent [19]
Washio et al.

[11] Patent Number: 5,354,169
[45] Date of Patent: Oct. 11, 1994

[54] STORAGE SYSTEM FOR RODS

[75] Inventors: Isomi Washio, Aichtal/Aich; Werner Latten, Reutlingen, both of Fed. Rep. of Germany

[73] Assignees: Advanced Technik GmbH, Fed. Rep. of Germany; Amada Company, Ltd., Japan

[21] Appl. No.: 974,845

[22] Filed: Nov. 10, 1992

[30] Foreign Application Priority Data

Nov. 12, 1991 [DE] Fed. Rep. of Germany ....... 4137169
Dec. 20, 1991 [DE] Fed. Rep. of Germany ....... 4142355

[51] Int. Cl.$^5$ .............................................. B65G 1/04
[52] U.S. Cl. ................. 414/745.7; 414/281; 414/746.7
[58] Field of Search ............... 441/281, 282, 277, 222, 441/745.7, 746.7, 746.8

[56] References Cited

U.S. PATENT DOCUMENTS

| | | | |
|---|---|---|---|
| 3,741,419 | 6/1973 | Bergerhoff et al. | 414/282 X |
| 3,895,723 | 7/1975 | Stolzer | 414/745.7 |
| 4,372,724 | 2/1983 | Stolzer | 414/281 |
| 4,456,418 | 6/1984 | Harter et al. | 414/222 X |
| 4,478,673 | 10/1984 | Plocher | 414/277 X |
| 4,488,847 | 12/1984 | Stolzer | 414/281 X |
| 4,787,804 | 11/1988 | Edenäs | 414/281 |
| 4,838,749 | 6/1989 | Potocjnak | 414/277 |
| 4,881,634 | 11/1989 | Stolzer | 414/745.7 X |
| 5,039,270 | 8/1991 | Parks et al. | 414/277 X |
| 5,156,514 | 10/1992 | Zäh | 414/282 X |

FOREIGN PATENT DOCUMENTS

| | | |
|---|---|---|
| 0213070 | 3/1987 | European Pat. Off. |
| 268965 | 6/1988 | European Pat. Off. |
| 2364391 | 8/1975 | Fed. Rep. of Germany |
| 154865 | 4/1982 | Fed. Rep. of Germany |
| 2925469 | 7/1982 | Fed. Rep. of Germany |
| 3133108 | 1/1983 | Fed. Rep. of Germany |
| 3736122 | 4/1989 | Fed. Rep. of Germany |
| 3817745 | 11/1989 | Fed. Rep. of Germany |
| 2622178 | 4/1989 | France |
| 8400739 | 3/1984 | World Int. Prop. O. |

*Primary Examiner*—David A. Bucci

[57] ABSTRACT

A storage system for rods including a conveyor device and a crane system. The conveyor device is for feeding a working machine such as a cutting-off machine, and in particular for supplying and discharging rods to and from at least one roller path for feeding the rods into the working machine. The conveyor device includes a receiver device arranged at both sides of the roller path for conveying rods between a handling device of a stock of rods and the roller path, each receiver device having at least one receiver arm which is independently movable substantially vertically. The crane system includes a load crossbeam movable in the vertical direction for transporting a bar material, and load take-up device provided on the load crossbeam. The load crossbeam is subdivided into subcrossbeams which are movable individually.

20 Claims, 17 Drawing Sheets

STORAGE SYSTEM FOR RODS

BACKGROUND OF THE INVENTION

1. Field of the Invention

The present invention relates to a storage system for rods which system includes a conveyor device and a crane system. The conveyor device is for feeding a rod into a working machine such as a cutting-off machine and the like, and in particular for supplying and discharging rods to and from at least one roller path for feeding the rods into the working machine. The conveyor device includes displaceable receiver means arranged at both sides of the roller path for conveying rods between a handling device of a stock of rods and the roller path. Such a conveyor device is especially provided for depositing the rods taken from a store of shelves onto the roller path which is preferably aligned with the cutting-off machine or a material removal station, and for picking up remaining pieces from the roller path to deliver these pieces again to the handling device of the stock of rods. Meanwhile, the crane system includes a load crossbeam means movable in the vertical direction for transporting bar material, and a load take-up means provided on the load crossbeam means.

2. Prior Art

DE-C-31 33 108 discloses a device for storing rod-shaped material and for supplying a cutting-off machine with this material. In this case the profiled rod material is deposited in a cantilever-type shelf system which consists of a plurality of shelves and which is handled via a gantry crane comprising a crane bridge movable over the shelves and a load crossbeam which is adapted to be vertically lowered between the shelves. A vertical carriage having roller paths arranged vertically one on top of the other is arranged on a shelf support in an area without shelves. A working position of the vertical carriage and thus the position of a roller path corresponds to the feed position for the rods to the cutting-off machine. While the material which is positioned on the roller path located at delivery level is being supplied to or worked by the cutting-off machine, the crane system deposits the rods to be worked in the next operation on the free roller path or takes the remaining material from the path to return it to the shelf system.

Such a solution, however, requires two drivable roller paths. Another roller path assigned to the machine system as well as corresponding separate drives must normally be provided here. Moreover, the device effects a relatively fixed relationship between the position of the cutting-off machine and the assembly of the shelves of the material store.

DE-A-38 17 745 discloses a device for feeding a working machine with rod-shaped material. In this publication the material is deposited by a vertical and horizontal endless conveyor with synchronously rotating conveyor means on a roller bed and is received and transported away by the roller bed and returned again to the crane system which cooperates with a material-storage shelf system.

With such a device, however, conveyor means which are respectively arranged vertically and horizontally in the longitudinal direction of the roller path in successive order must be arranged between the rollers of the roller bed and must additionally be matched in their position to the fork prongs of the crane bridge and the support arms of the shelf-type store. This might have an influence on the minimum length of the length of the rods that can be transported without problems.

Both the device according to DE-C-31 33 108 and the apparatus according to DE-A-38 17 745 have the great disadvantage that the respective roller path can only be supplied with material at one side by the conveyor device forming a quick-change station. In the case of a two-sided cantilever-type store, such a design calls for a respective rearrangement of the rods, so that the rods can be picked up by the fork prongs of the crane bridge or the load crossbeam of the gantry crane which face the conveyor device or quick-change station.

DE-C-29 25 469 discloses a device for storing rod-shaped material and for automatically supplying a cutting off machine with the material in program-controlled fashion, with a roller path being movable via a vertical carriage on a shelf support of the cantilever-type shelf system. A load crossbeam of the gantry crane which serves to operate the cantilever-type shelf system is provided for keeping ready successive material for the next operation above the vertical carriage which is in its working position and for lowering the material into the working position of the roller path when (after the end of the current working step) the vertical carriage is lowered together with the roller path to deposit the remaining material on a working carriage which is horizontally movable between two shelves. After having been returned into its operating position by the vertical carriage along the shelf support, the roller bed takes over the material held ready by the load crossbeam of the crane system which has been lowered into the operating position so as to continue the material supply to the cutting-off machine. The load crossbeam of the gantry crane is moved laterally and lowered to pick up the remaining material from the working carriage.

With such a solution, which is also troublesome from a constructional point of view, the lost times (material changing times) can, however, not be kept so small as would be desirable because the use of the load crossbeam of the crane system as an intermediate store considerably limits the flexibility of the whole material transporting process.

A conveyor device of the above-mentioned kind is known from DE-C-37 36 122. The lifting device is also arranged within a cantilever-type store between two shelf units and within an area which is free from cantilevers. The lifting device serves to transfer rods from a shelf to a roller path, and vice versa, in order to supply the rods, for instance, to a cutting-off machine. In this case, there are guides which extend at both sides next to the roller path obliquely upwards away from the path and along which carriages are movable that carry horizontally matching trays for the rods. Thus, the shelves can be moved between a lower end position in which the upper edges of the trays are below the support plane of the roller path, and an upper end position in which this upper edge is located above the support plane and laterally offset relative to the roller path.

Such a solution which is based on the principle of an inclined lift calls, however, for a relatively expensive support and drive construction for the carriages which are movable along the inclined guides. Moreover, the two trays at both sides of the roller path can first only be unloaded in an alternate way by the shelf handling device, such as the load crossbeam of a gantry crane system, and can then only be fed again with material, resulting in waiting times. After an upward movement of a tray with the remaining material into an upper transfer position to the gripper prongs of the load crossbeam of the gantry crane, the material must first be picked up by the load crossbeam and transported away before the next rods can be deposited on this tray. During this time the other tray which deposited rods were deposited on the roller path in the preceding cycle, remains below the roller bed of this roller path. Furthermore, a relatively great corridor width is required between the shelves for the accommodation of the apparatus because of the upwardly diverging position of the inclined guides, with the respective transfer position of the tray being at a considerable laterally distance from the roller path with respect to the shelf handling device.

Meanwhile, a conventional crane system for rods includes the following construction and disadvantages.

That is to say, as mentioned above, cantilever-type stores are conventionally used for storing bar material, which consist of a plurality of parallel shelves, which, in turn, comprise a row of support arms spaced in the main direction of extension of the shelves (shelf width) and extending preferably on both sides of the shelf stands at the shelf stands. The shelf stands form stock shelves for storing bar material of the same or different sections according to type of material, cross-sections of the sections, etc.

An aisle is formed between adjacent shelves for permitting a bar material to be transported therethrough. The removal of bars of material from the shelves and the redepositing of remaining material is carried out by means of a crane system which can be moved along rails provided on the longitudinal outer sides of the cantilever-type stores and extended in the direction perpendicular to the extension of the shelves.

The crane system includes a load crossbeam means, and a load take-up means provided on the lower end of the crossbeam means and in the form of fork prongs. The load take-up means can be lowered from the crossbeam means and moved into the aisles between the shelves and into the stock shelves of the shelves for the removal of the bar material. The bar material removed from the shelves may be delivered to a roller path disposed within the cantilever-type store between two shelves for delivering the bar material to a cutting machine or the like.

The load crossbeam is used at the same time to pick up a remaining piece of bar material from the roller path and to return it into a stock shelf. The supporting arms extending on both sides along the longitudinal axis on the lower end of the load crossbeam can advantageously inserted between respective adjacent supporting arms of the shelves of the cantilever-type store, and engage with bottom surface of the bar material for Its removal or place it on the shelf support arms.

In such a handling device for a bar material store difficulties occur partly, if due to a distortion of the section or due to an oblique depositing of the bar material deposited in the shelves of the cantilever-type store, a simultaneous gripping with all fork-prong supporting arms of the load cross beam is difficult. Moreover, there are partly difficulties in handling relatively short bars of material which are disposed axially aligned in a stock shelf of a shelf.

SUMMARY OF THE INVENTION

It is therefore the first object of the present invention to provide a conveyor device in which the operative connection with the handling device of the rod store is Improved. That is to say, the reception of the rods by the conveyor device from the handling device of the rod store and the transfer to this handling device can be facilitated.

In accordance with the invention, this object is attained in that each of the receiver means includes at least one receiver arm which is independently movable substantially vertically.

The conveyor device of this invention has an advantage that the cooperation of the conveyor device with the roller path can be simplified, with lost times being avoided. Moreover, the space needed for the conveyor device should be relatively small.

In a preferred embodiment of the invention, the receiver arms of the two receiver means respectively project at one side towards the roller path and include supporting members spaced-apart in the longitudinal direction of the roller path. Further, the receiver arms are each secured to a longitudinal transverse member which is supported on a vertical guide means, preferably a vertical carriage of the respective receiver means.

In another preferred embodiment of the invention, one obtains a control which is especially advantageous as to the control of the receiver means and the handling device for handling the stock of rods, in the case of which the space needed is reduced. That is to say, in this embodiment a take-over/delivery position which is shared by the two receiver devices is provided above the roller path and rods are deposited on the roller path by lowering the respective receiver arm through the horizontal roller bed of the roller path.

The receiver means which are arranged at both sides of the roller path are preferably mounted on a common, carriage-like basic frame which is movable under the roller path and in a direction transverse to the roller path. With this arrangement, the vertical movement of each receiver arm is effected by the separate vertical guide means of each receiver means while the horizontal movement of each receiver arm is effected by the joint horizontal displacement of both receiver means.

Apart from the advantages of a construction which is simplified with regard to the necessary control operations, this solution of the invention has additional advantages that it offers a relatively simple rigid construction and effects a drastic reduction of standstill or waiting times. This is because the receiver arms of the two receiver devices operate alternately and independently of each other in such a way that a horizontal movement of one of the receiver arms into the take-over/delivery position above the roller path or a waiting position which is laterally offset relative to the roller path above the path is possible even when the rods are positioned on the roller path.

The receiver arm of the one receiver means is normally kept ready below the horizontal roller bed for transporting the remaining material away from the roller bed whereas the receiver arm of the receiver device positioned at the other side of the roller path is disposed in the takeover/delivery position relative to the handling device of the stock of rods (shelf-operating device).

In another preferred embodiment of the conveyor device, each receiver means may include a plurality of vertically superimposed receiver arms which are supported on a common, vertically movable transverse member and/or at least one of the receive arms may have discrete storing sections for storing a plurality of rods of the stock of rods next to each other. In this embodiment, the one or the plurality of receive arms of each receiver means may simultaneously serve as an intermediate storage means for the rods.

Now, the second object of the present invention is to improve the crane system in such a way that the load crossbeam means, in particular its load take-up means are better suited to handle bent or distorted bar material and to handle bar material of relatively short length.

This object is attained according to the second feature of the invention by a crane system including the load crossbeam means which is subdivided into the subcrossbeam means which are vertically movable independently of each other.

A large flexibilizatlon of the load supporting system of the crane system is achieved by this solution. This is because for example the active crossbeam width of the load crossbeam means (distance between the end supporting arms in the longitudinal direction of a crane bridge) is subdivided by the formation of at least two subcrossbeam means. Thus, for example, relatively short bar materials located for example in axial alignment in a stock shelf can be handled separately by the subcrossbeam means that work respectively in a half area for example with respect to the shelf width.

According to a preferred embodiment of the invention the load crossbeam means has a single crossbeam which includes two subcrossbeams, the subcrossbeams being movable at least vertically independently of each other within the crossbeam. The subcrossbeams are preferably guided in linear guide means within the crossbeam, and are movable within the crossbeam even if the crossbeam is immersed into a stock shelf of a bar material store.

According to a further embodiment of the invention several, preferably two subcrossbeam means are individually movable along a crane bridge and at least vertically movable independently of each other for handling the bar material. According to a further preferred embodiment of the invention, an additional horizontal movement of the load take-up means of the load crossbeam means may be provided independently of the movement of the entire crane bridge.

According to a further preferred embodiment of the invention the load crossbeam means comprises at least one crossbeam, and each crossbeam is provided with a plurality of spaced supporting arms extending in the direction of the crossbeam width (in the longitudinal direction of the crane bridge) preferably to two opposite sides, so that each load crossbeam means has load take-up means shaped as fork prongs.

The supporting arms of a crossbeam are preferably connected to two supporting arm groups, and each supporting arm group is vertically and/or horizontally movable within the load crossbeam means.

In this fashion, the bearing points of the supporting arms projecting on both sides of an associated crossbeam like fork prongs can also be used for the individual handling of relatively short bars of material located in a side-by-side relationship in a stock shelf. Moreover, bar material which has shape deviations from a straight longitudinal central axis or which is located obliquely in the stock shelf can be taken up better than before by the supporting arms which can be differently driven and reliably conveyed by means of the crossbeam.

The load crossbeam means with the subcrossbeam means can be guided vertically movably preferably at the front side of movable portal supports and supported at their ends by a suspension at a crane bridge of the crane system.

Further preferred developments of the subject matter of the invention are set forth in the remaining subclaims.

The invention shall now be explained in more detail hereinafter with reference to embodiments and accompanying drawings in which:

DESCRIPTION OF THE PREFERRED EMBODIMENTS

Figure 1:
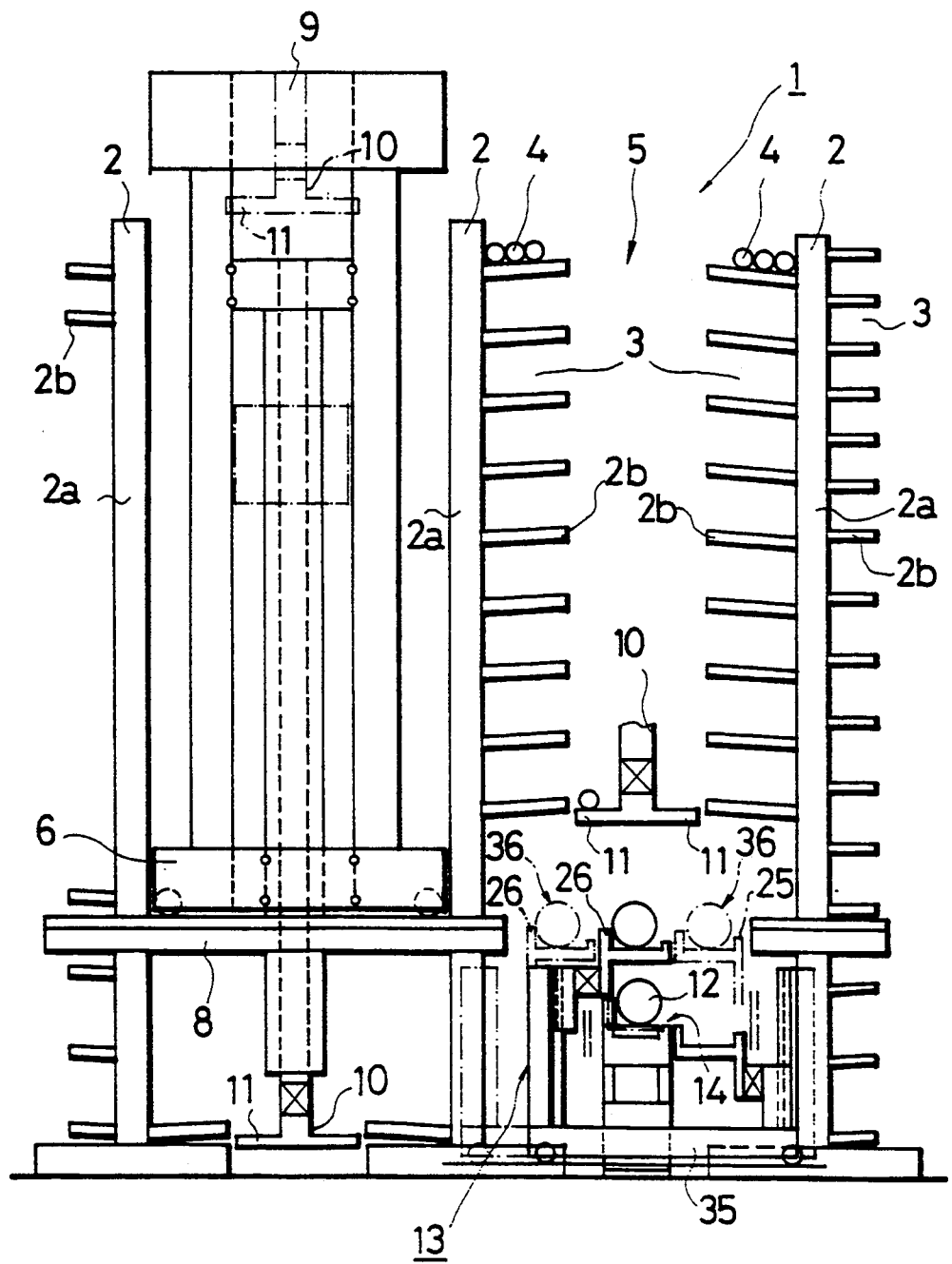
FIG. 1 shows part of a cantilever-type store for rods with a conveyor device arranged therewith in accordance with the first feature of the present invention in a front diagrammatic representation.

FIG. 1 is a diagrammatic front view of a cantilever-type store 1 in the area of three shelf units 2 which extend in a plane perpendicular to the plane of the drawing, and are equipped with shelf supports 2a and cantilevers 2b which are secured to both sides of the supports 2a. The cantilevers 2b form material compartments 3 for receiving rod material 4 of the same or different profile sorted according to the type of material, profile cross-sections, and the like. A corridor 5 is formed between adjacent shelf units 2, for the transport of the rod materials 4.

The operation of the cantilever-type store 1, i.e., the withdrawal of rods 4 and the reinsertion of the same into the compartments 3, is effected by a gantry crane system 6, which is outlined diagrammatically in FIG. 1. This gantry crane system 6 is movable along rails 8 provided on the longitudinal outer sides of the cantilever-type store 1 and extends in a direction transverse to the longitudinal extension of the adjacent shelves 2. A crane bridge 9 of the gantry crane system 6 carries a load crossbeam 10 which is provided with a load receiving means 11 extending at both sides of the crossbeam 10 in the form of fork prongs. The crossbeam 10 is adapted to vertically lowered from the crane bridge 9, so that the crossbeam 10 together with the load receiving means 11 can be moved into a corridors 5 between shelves 2 and into a compartment 3 for withdrawing or delivering rods 4. At the same time, the load crossbeam 10 serves to deliver a picked-up rod 12 of the stock of rods to a conveyor device 13 which is described hereinafter.

As shown at the right side in FIG. 1, the conveyor device 13 is arranged within a tunnel between the shelf units 2 and free from cantilevers 2b. The conveyor device 13 extends in parallel with the longitudinal extension of the shelf units 2, i.e. in a direction perpendicular to the plane of the drawings in FIG. 1. The conveyor device 13 is provided for depositing rods 4 onto a roller path 14 which also extends in parallel with the longitudinal extension of the shelf units 2 and in a direction perpendicular to the plane of the drawing in FIG. 1. The roller path 14 feeds a rod 12 to a working machine (not shown), in particular to a saw for the rod materials into sections. The conveyor device 13 removes a remaining material from the roller path 14 after cutting operation, and to deliver the material to the load crossbeam 10 of the gantry crane system 6 for re-sorting it in a material compartment 3 of the associated shelf unit 2.

In FIG. 1 (left half) the cantilevers 2b have been omitted between the central and left shelf units 2 for illustrating the gantry crane system 6 clearly.

Figure 2:
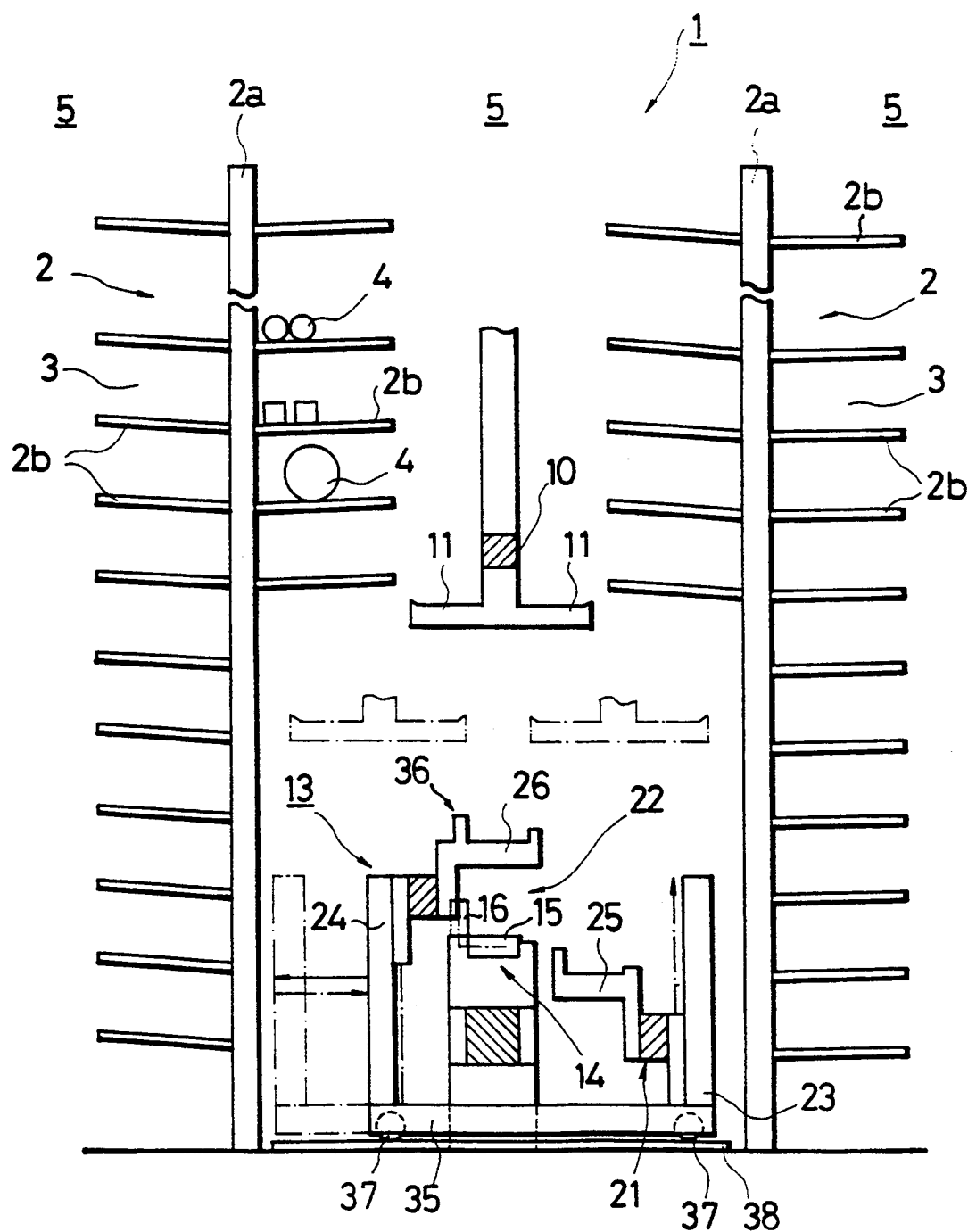
FIG. 2 is a front representation of the conveyor device in the area of two shelves of the cantilever-type store, similar to that shown in FIG. 1.
Figure 3:
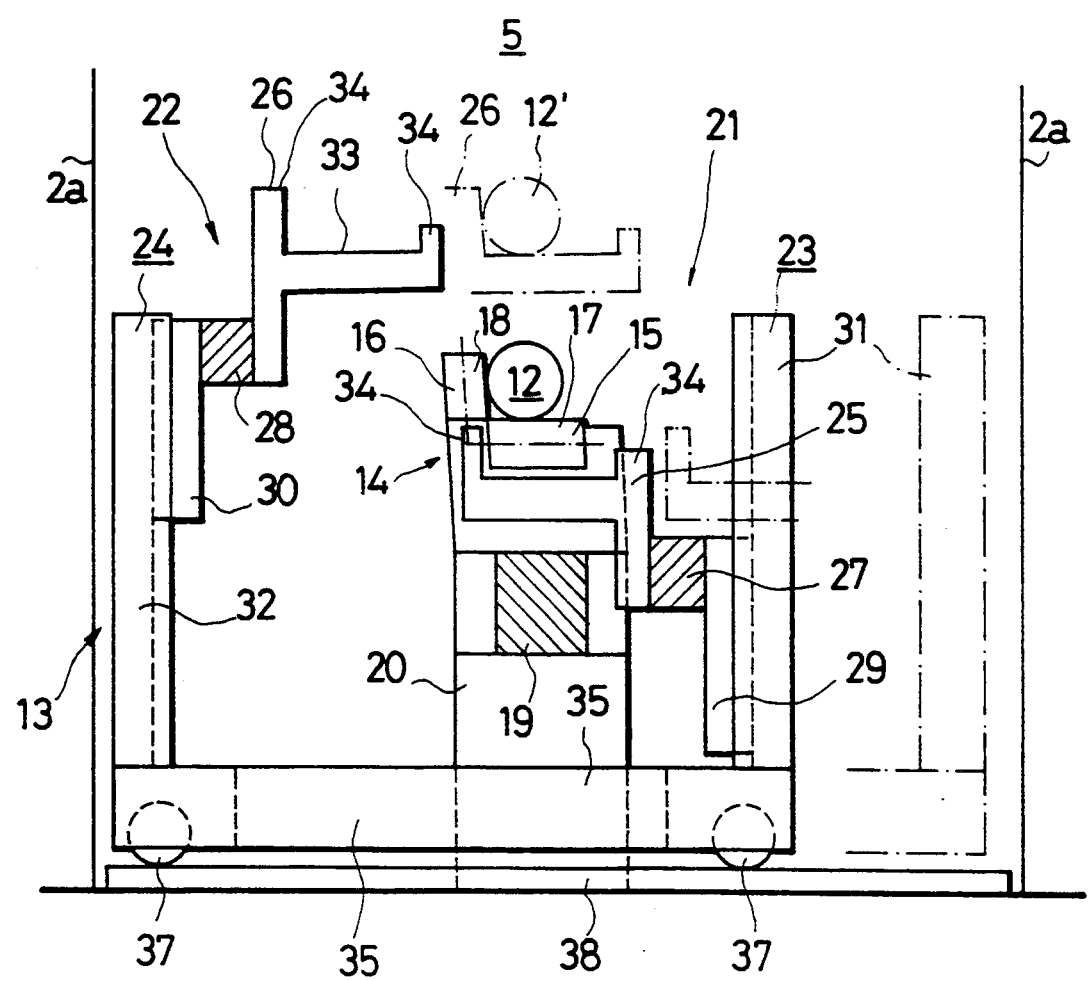
FIG. 3 is a diagrammatic front view of the conveyor device in a position changed with respect to the representations in FIGS. 1 and 2.

A first embodiment of the conveyor device shall be in detail explained hereinafter with reference to FIGS. 1 through 3 in which the conveyor device 13 is shown diagrammatically from the front. As best shown in FIG. 3, in the present embodiment the roller path 14 has a substantially horizontal roller bed 15 and a vertical roller bed 16. The roller bed 15 includes a plurality of conveyor rollers 17 that are spaced apart from each other in the direction perpendicular to the plane of the drawing in FIGS. 1-3 (only one of the rollers 17 is shown in FIGS. 1-3). Likewise, the roller bed 16 consist of a plurality of conveyor rollers 18. Further, the conveyor rollers 17 are slightly inclined toward the vertical roller bed 16, and the conveyor rollers 18 are slightly inclined outwards relative to the vertical. Thus, a rod 12 deposited on the roller path can be conveyed in the longitudinal direction of the roller path 14, reliably in abutment with and laterally guided by the vertical roller bed 16.

The roller path 14 includes a frame 19 which is open below the support of the conveyor rollers 17 and which forms lateral passage openings 20 at least partly in the lower portion.

The roller path 14 is driven by a drive (not shown) which is shared by the two roller beds 15, 16. Thus, the roller path 14 conveys the rods 12 deposited on the roller bed 15, possibly through another roller path 14 forming the extension of the roller path 14, to a device positioned outside the cantilever-type store 1, for example, a cutting-off saw or also a material removing station, and returns remaining pieces 12 back to the conveyor device 13. The vertical roller bed 16 ensures a corresponding lateral guide of the transported rods 12. A common drive may optionally be provided for the successive roller paths.

As becomes especially apparent from the details shown in FIGS. 1-3, the conveyor device 13 includes receiver means 21, 22 at both sides of the roller path 14, namely a first receiver means 21 at the right side of the roller path 14 and a second receiver means 22 at the left side of the roller path 14.

Each receiver means 21, 22 has a vertical guide means 23, 24 for vertically supporting a receiver arm 25 or 26, respectively, in a slidable way. The receiver arm 25, 26 serves to supply the rods 12 to the roller path 14 and to remove the rods from the path 14 to deliver the same to the load crossbeam 10 (FIGS. 1 and 2). Specifically, each receiver arm 25, 26 preferably includes a plurality of supporting members which are spaced apart from each other in the direction perpendicular to the plane of the drawing in FIGS. 1-3 (only one of the supporting members is shown in FIGS. 1-3). As a result each receiver arm 25, 26 has a prong-like structure. The receiver arms 25, 26 respectively secured to the associated transverse member 27, 28 in such a way that they project laterally towards the roller path 14. The transverse members 27, 28 extend in the direction perpendicular to the plane of the drawing in FIGS. 1—3. Each transverse member 27, 28 is secured to an associated vertical carriage 29, 30 which, in turn, is vertically supported in a slidable way on a corresponding vertical guide support 31, 32 of the vertical guide means 23, 24. A plurality of guide supports 31, 32 including associated vertical carriages 29, 30 respectively are provided in the longitudinal direction of the conveyor device 13 (i.e. in a direction perpendicular to the plane of the drawing) in parallel with the shelf units 2.

Each of the receiver arms 25, 26 possesses a receiver trough 33 which is defined by vertical projections 34 of different height and serves to store the rods 12', as is drawn for the second receiver means 22 in FIG. 3 in dash-dotted line and in FIG. 1 in full lines for a rod 12. The vertical projections 34 which are respectively arranged in the figures at the left side of the associated receiver arm 25, 26 serve the abutment of the rods supported by a corresponding inclination of the receiver trough 33. The vertical projections 34 at the right side, which is smaller as to height, just serve to secure the position of the rods 4 and could possibly be dispensed with entirely. The vertical projection 34 at the left abutment side has preferably a height which substantially corresponds to half the profile height or the radius of the rods 4, so that a correct position of the rods 4 is ensured when these are lowered onto the roller path 14. For the same reason, the vertical roller bed 16 also has a height that is greater than or equal to half the profile height (material height). The vertical projections 34 at the right side define the width of the receiver trough 33, which in turn, determines the maximally admissible material width of the trough 33.

In FIG. 1 the upper end positions of the receiver arms 25, 26 shown in dash-dotted lines illustrate delivery positions 36 in which the receiver arms 25, 26 cooperate with the load crossbeam 10 of the gantry crane system 6. The dimensional and motional relationships, including the width of the receiver arms 25, 26, are understood from FIG. 1 in which another position of the receiver arm 26 is shown in full lines. That is to say, the arms 25, 26 are dimensioned such that an independent trouble-free vertical movement of the receiver arms 25, 26 is ensured, permitting also a lateral guiding of the receiver arms 25, 26. In particular, the arms 25, 26 pass each other in connection with the corresponding vertical movements of the vertical carriages 29, 30.

To implement the horizontal movement of each receiver arm 25, 26 for feeding the roller path 14 with material 12 or for removing remaining material from this path 14 for delivery to the load crossbeam 10, the vertical guide supports 31, 32 are fixedly arranged in the illustrated embodiments on a carriage-like basic frame 35. The frame 35 extends in the bottom side of the frame 19 of the roller path 14 in a direction transverse to the longitudinal extension of the path 14 through the passage opening 20 and is displaceable with the aid of rollers 37 on rails 38 in a direction transverse to the roller path 14.

In FIGS. 1 and 2 the basic frame 35 with the first and second receiver means 21, 22 in full lines is shown in a right end position in which the receiver arm 26 of the second receiver means 22 is in the delivery position 36. On the other hand, in FIG. 3 the "carriage" formed by the first and second receiver means 21, 22 and the basic frame 35 is in the left end position in which the receiver arm 25 of the first receiver means 21 is in a receiving position below the horizontal roller bed 15 for removing the rod 12 which is positioned as remaining material on the roller path 14.

The Joint rigid mounting of the first and second receiver means 21, 22 on the basic frame 35 permits a matched and program-controlled movement of the first and second receiver means 21, 22 and their associated receiver arms 25, 26 by means of a motor. That Joint rigid mounting also ensure the receiver means having a fixed horizontal distance from each other. Hence, such a design prevents a collision of the receiver arms 25, 26 in a reliable way.

However, in another embodiment of the conveyor device 13 it is also possible to arrange the first and second receiver means 21, 22 in such a way as to allow their horizontal adjusting movements in an entirely separated way. In this case, it is ensured through a corresponding program control that the first and second receiver means are each positioned with their projecting receiver arms in horizontally spaced-apart relationship, and the receiver arms 25, 26 can be moved vertically without any collision.

To deposit the rods 4 onto the roller path 14 after delivery from the load crossbeam 10 and to receive a remaining piece from the roller path 14 for transfer to the load crossbeam 10, adjacent conveyor rollers 17, 18 of the horizontal and vertical roller beds 15, 16 have a longitudinal distance matched to the longitudinal distance of the supporting members of the receiver arms 25, 26, and each conveyor roller 17 or 18 is positioned between the corresponding adjacent supporting members of the receiver arm 25 or 26 in the longitudinal direction of the conveyor path 14. As a result, a free vertical movement of the receiver arms 25, 26 is possible from above to the bottom through the horizontal and vertical roller beds 15, 16 for depositing a rod onto the roller bed 15, and from the bottom to the top for returning remaining material in a corresponding way.

As shown in FIGS. 1-3, the distance between the guide supports 31, 32 on the basic frame 35 is chosen as follows: In the respective left end position (FIG. 3) or the respective right end position (FIGS. 1 and 2), the guide support 31 or 32 which is arranged near the adjacent shelf support 2a and has a maximum distance from the roller path 14, is spaced apart from the roller path 14 to such an extent that the supporting members of the receiver arms 25 or 26 are freely displaceable vertically past the roller path 14; and at the same time, the receiver arm 25 or 26 of the other guide support 32 or 31 which is arranged adjacent to the roller path 14 may be positioned in an opening below the horizontal roller bed 15 or in the transfer position above the roller path 14, as shown for the receiver arm 25 of the first receiver means 21 in FIG. 3 (the arm 25 is positioned below th roller bed 15 in FIG. 3). When the entire conveyor device 13 has been moved horizontally with the basic frame 35 and the first and second receiver means 21, 22 into the other end position, the receiver arm 25 or 26 of the respectively other receiver means 21 or 22 can be moved or positioned accordingly.

Figure 4A:
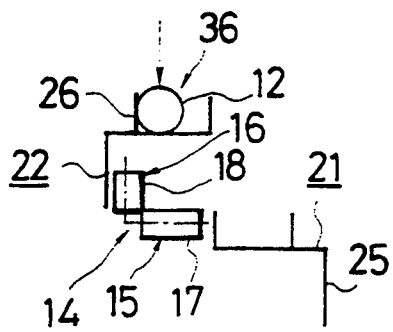
FIGS. 4A–4T show a flow chart of a material changing cycle for illustrating the operation of the conveyor device according to the first feature of the first embodiment of the present invention.

The first operating mode of the conveyor device 18 shall now be explained with reference to FIG. 4A–4T. As far as designated positions of the respective receiver arms 25, 26 are concerned, reference is also made to the already explained FIGS. 1–3. FIGS. 4A–4T schematically illustrate the horizontal and vertical roller beds 15, 16 of the roller path 14 and the receiver arms 25 and 26 of the first and second receiver means 21, 22.

In FIG. 4A the working cycle begins in a position of the conveyor device 18 as illustrated in FIGS. 1 and 2. That is to say, the conveyor device 13 is in the right end position and the receiver arm 26 of the second receiver means 22 is in the take-over/delivery position 36 above the roller path 14. In the take-over/delivery position the rod 12 is supplied to the receiver troughs 33 of the receiver arm 26 by the load crossbeam 10 of the gantry crane system 6 (not shown in FIGS. 4A–4T). The receiver arm 25 of the first receiver means 21 is in a position laterally next to the horizontal roller bed 15.

Figure 4B:
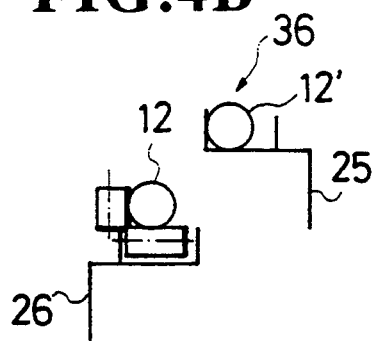

As shown in FIG. 4B, the left receiver arm 26 is then lowered for depositing the rods 12 on the roller path 14. Namely, the supporting members of the receiver arm 26 pass through the longitudinal spaces between the conveyor rollers 17, 18 of the horizontal and vertical roller beds 15, 16 until the receiver arm 26 of the second receiver means 22 is positioned in the opening below the horizontal roller bed 15, whereby the rod 12 is deposited on the roller path 14. During this downward movement of the receiver arm 26, the right receiver arm 25 is moved upwards into its take-over/delivery position 36, where another rod 12' is deposited onto the receiver arm 25 by the load crossbeam 10.

Figure 4C:
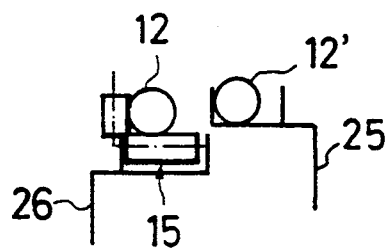
Figure 4D:
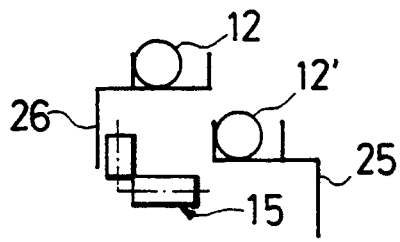

As shown in FIGS. 4C and 4D, to keep the time during which no rods 4 rest on the roller path 14 as little as possible, after the reception of the rod 12' the right receiver arm 25 may be lowered into an intermediate position which is laterally above the horizontal roller bed 15. During the lowering movement of the receiver arm 25 the rod 12 is still positioned on the roller path 14 or the rod 12 is lifted away as a remaining material from the roller path 14 by the left receiver arm 28 which passes between the conveyor rollers 15 and 18 (FIG. 4D).

Figure 4E:
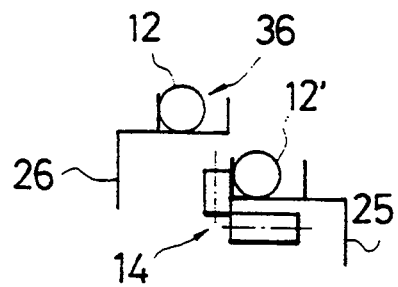

After the left receiver arm 26 has reached its upper end position and the right receiver arm 25 has simultaneously occupied the intermediate position laterally above the horizontal roller bed 15, the whole conveyor means 13 is horizontally displaced with the aid of the displaceable basic frame 35 to the left into the other end position (FIG. 4E). In FIG. 4E, the receiver arms 25, 26 occupy the positions in which the left receiver arm 26 is in its take-over/delivery position 38 and the right receiver arm 25 is positioned above the horizontal roller bed 15 for being lowered through the roller path 14 and for depositing the rod 12' onto the roller path 14.

Figure 4F:
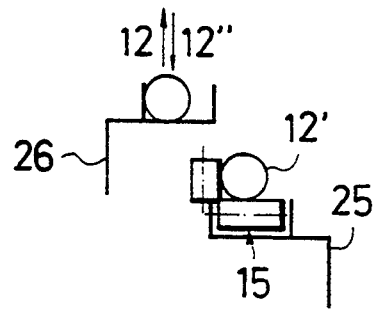

Subsequently, as shown in FIG. 4F, the right receiver arm 25 is lowered to the lower end position below the roller bed 15 for depositing the rod 12' onto the roller bed 15. On the other hand, the rod 12 on the left receiver arm 26 is taken by the load crossbeam 10 of the gantry crane system 6 to be returned into an associated compartment 3 of a shelf unit 2. Then, a rod 12" which is needed for the next supply operation is supplied to the left receiver arm 26 by the crossbeam 10.

Figure 4G:
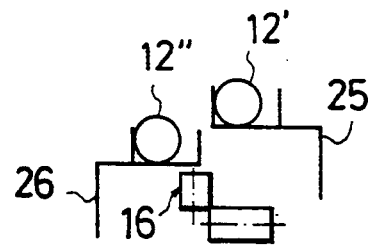

Subsequently, as shown in FIG. 4G, the left receiver arm 26 may also be lowered into an intermediate position laterally above the vertical roller bed 16 while the rod 12' is removed from the roller path 14 upwards by the right receiver arm 25.

Figure 4H:
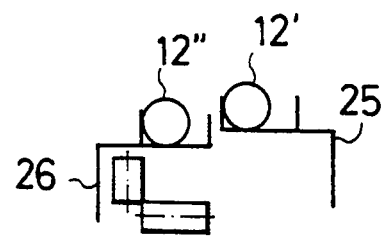
Figure 4I:
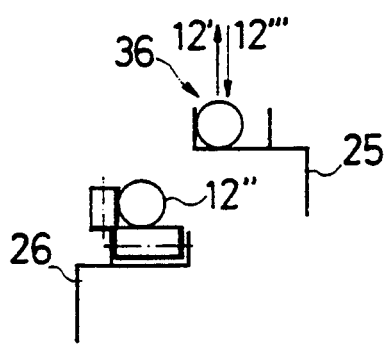

After the right receiver arm 25 is reached the upper end position, the whole conveyor device 13 is again moved horizontally along the rails 38 to the right, as shown in FIG. 4H. This has the consequence that the right receiver arm 25 is now again in its take-over/delivery position for delivering the rod 12' to the load crossbeam 10 for returning the same into one of the compartments 3 and for receiving a new rod 12''' (FIG. 4I). In FIG. 4I, the left receiver arm 26 is then brought into its lower end position below the horizontal roller bed 15 with the rod 12" being deposited on the roller path 14. The moving cycle of the first and second receiver means 21 and 22 start now again.

As becomes apparent from the above explanations, there are hardly any unproductive times when the roller path 14 is supplied with no rods, thanks to the conveyor device 13. This is the result of the parallel operations of the two receiver arms 25 and 26 which operations coincide in time, so that the standstill time during which no material is positioned on the roller path can be minimized.

Figure 4J:
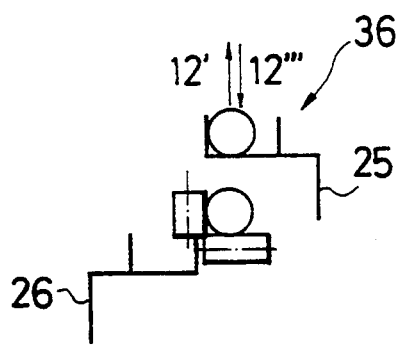
Figure 4K:
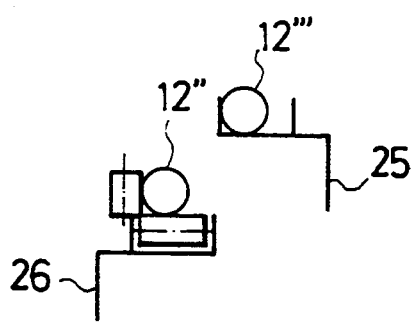
Figure 4L:
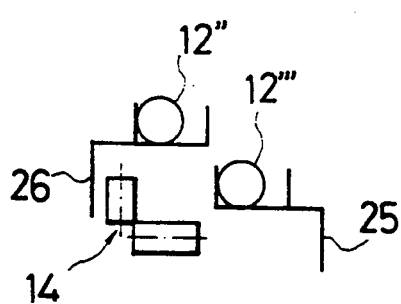
Figure 4M:
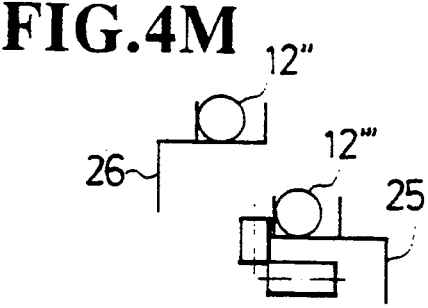
Figure 4N:
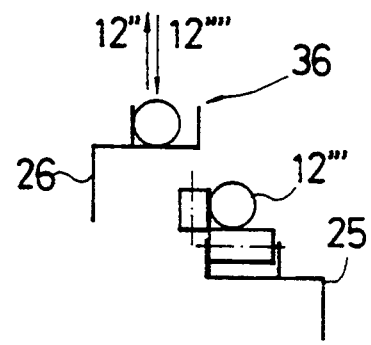

As shown in FIG. 4J, in the second operation mode of the conveyor device, the separate take-over/delivery positions for the two receiver arms 25, 26 are dispensed with so as to save space in the respective upper end positions of the receiver arms 25, 26. That is to say, a single and central take-over/delivery position 36 is established directly above the roller path 14 by moving the conveyor device 13 horizontally into the opposite end position after the respective rods have been deposited onto the roller path 14. This additional horizontal movement of the conveyor device 13 makes it possible to provide, independently of the receiver arm 25, 26 positioned for a take-over/delivery operation, the delivery position 36 always in the same position for taking rods 12''' from the load crossbeam 10 or for delivering rods 12' to the load crossbeam 10. The central take-over/delivery position is shown by dash-dotted line above the roller path 14 in FIG. 3.

As far as the movement cycle of the receiver arms 25, 26 is concerned, FIGS. 4K–4N correspond to FIGS. 4B–4F and illustrate the beginning of another conveying cycle.

Figure 4O:
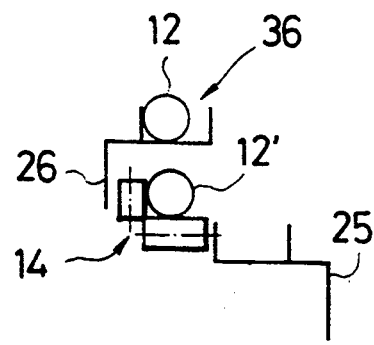
Figure 4P:
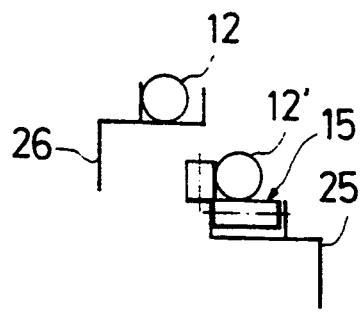
Figure 4Q:
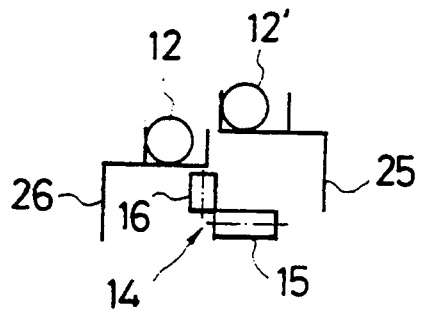
Figure 4R:
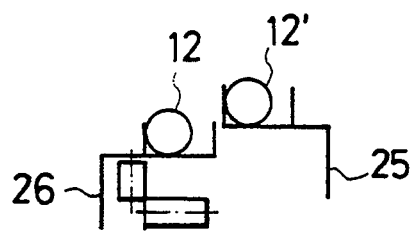
Figure 4S:
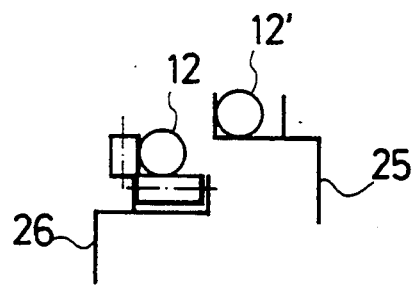
Figure 4T:
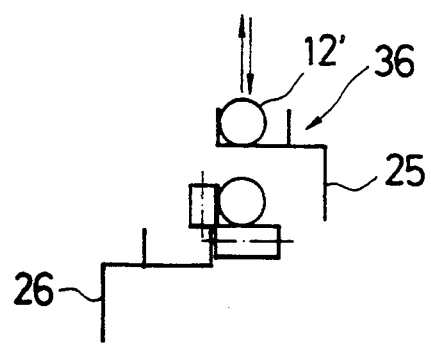

FIGS. 4O–4T illustrate a conveying cycle with the central delivery position 36 which is the same for both receiver arms 25, 26, as already mentioned with reference to FIG. 4J. In FIG. 4O, the rod 12 has been deposited onto the left receiver arm 26 which is in the delivery position 36 by the load crossbeam 10 (not shown).

The rod 12' which was supplied in a preceding conveying cycle to the roller path 14 rests on the roller path 14.

Subsequently, the whole conveyor device is horizontally moved by the movable basic frame 35 into the left end position, so that the right receiver arm 25 is positioned below the horizontal roller bed 15, as shown in FIG. 4P. As shown in FIG. 4Q, the right receiver arm 25 is then moved upward to lift the rod 12' away from the roller bed 15 while the left receiver arm 26 is lowered into the intermediate position.

After the right receiver arm 25 reached the delivery position 36, the conveyor device 13 is moved horizontally so that the left receiver arm 26 reaches a position in which it is vertically aligned with the roller bed 15, as shown in FIG. 4R.

Subsequently, the rod 12 is deposited on the roller path 14 and the left receiver arm 26 is brought into the lower end position (FIG. 4S). The conveyor device is then moved horizontally to the left end position (FIG. 4T), where the right receiver arm with the rod 12' is again in the central take-over/delivery position 36 for delivering the rod 12' to the load crossbeam 10 and for receiving a new rod therefrom.

Figure 5A:
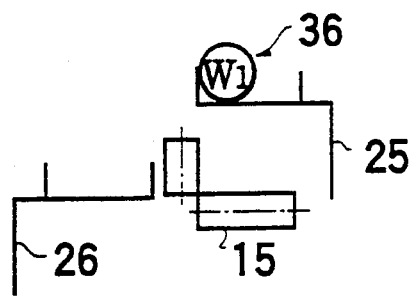
FIGS. 5A–5P show a flow chart of still another material changing cycle by means of the conveyor device illustrated in FIGS. 1–3.
Figure 5D:
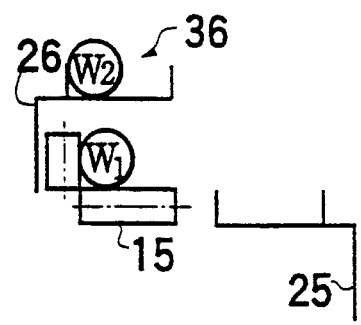
Figure 5B:
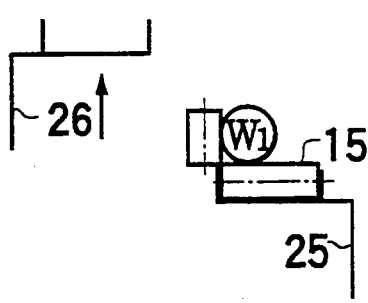
Figure 5E:
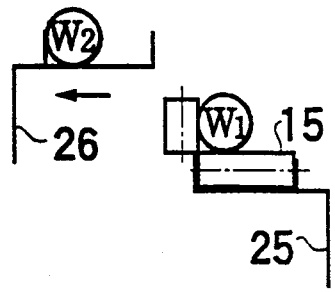
Figure 5C:
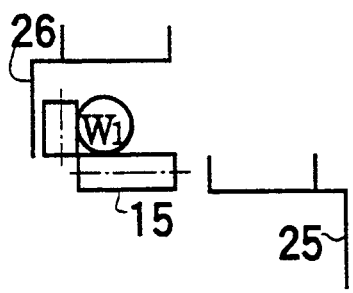
Figure 5F:
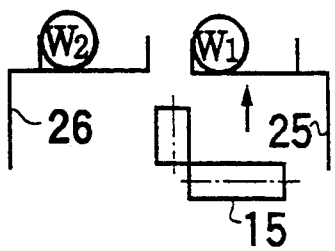
Figure 5G:
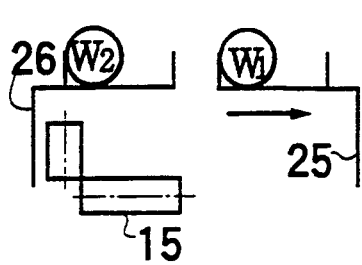
Figure 5J:
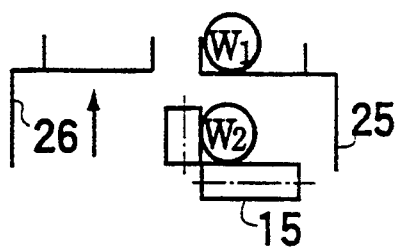
Figure 5H:
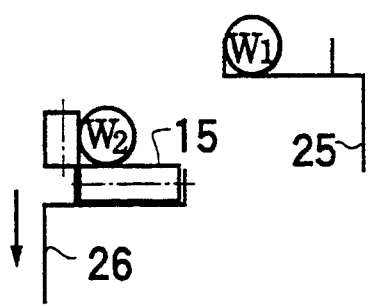
Figure 5K:
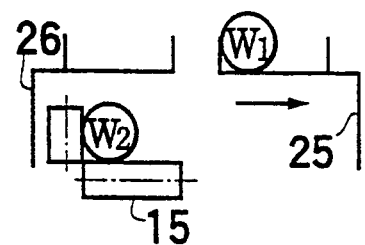
Figure 5I:
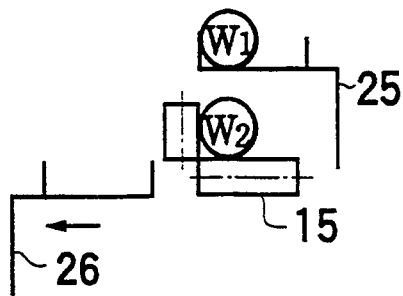
Figure 5L:
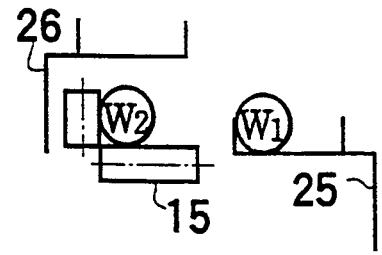
Figure 5M:
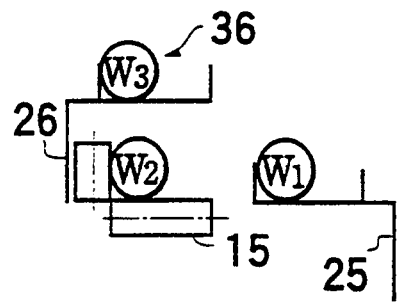
Figure 5N:
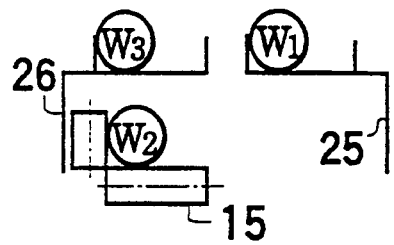
Figure 5O:
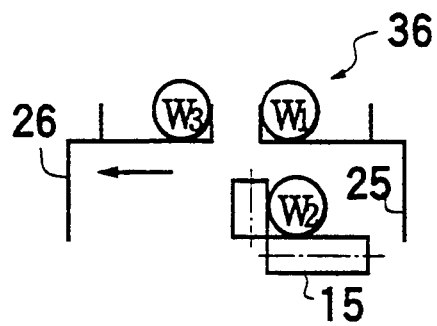
Figure 5P:
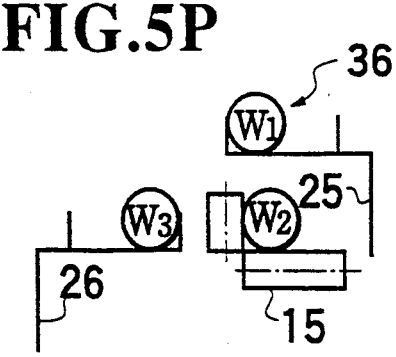

FIG. 5A–5P illustrate still another conveying cycle with the central delivery position 36. In FIG. 5A, a first rod W1 is supplied by the crossbeam 10 to the right receiver arm 25 in the central position 36. As shown in FIGS. 5B and 5C, the rod W1 is then deposited on the roller bed 15 by lowering the right receiver arm 25, while the left receiver arm 26 is moved upward and then to the right until it reaches the central delivery position 36.

In FIG. 5D, a second rod W2 is supplied by the crossbeam 10 to the left receiver arm 26 in the central delivery position 36. Subsequently, as shown in FIGS. 5E–5H, after the first rod W1 is taken from the roller bed 15 by moving the right receiver arm 25 upward, the second rod W2 is deposited onto the roller bed 15 by lowering the left receiver arm 26. The receiver arms 25 and 26 are then moved respectively in such a way as to go around the roller bed 15 in the clockwise direction until the left receiver arm 26 reaches the central delivery position 36 and the right receiver arm 25 reaches the intermediate position (FIG. 5I–5L).

In FIG. 5M, a third rod W3 is supplied to the left receiver arm 26 in the central delivery position 36. As shown in FIG. 5O, the receiver arms 25, 26 are then moved to the left until the right receiver arm 25 with the first rod W1 reaches the central delivery position 36. In FIG. 5P, the first rod W1 is then taken from the right receiver arm 25 as a remaining material by the crossbeam 10 (not shown).

Figure 6:
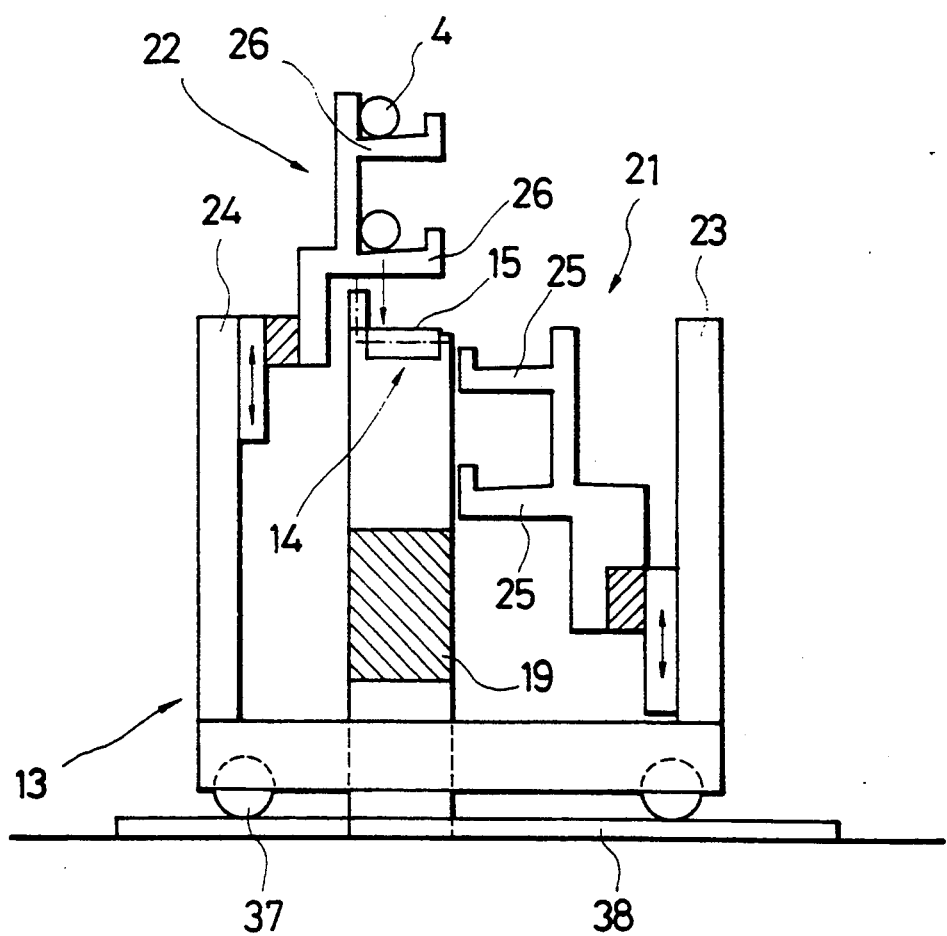
FIG. 6 shows a representation similar to that in FIG. 3, for another embodiment of the conveyor device according to the first feature of the present invention.

Another embodiment of the conveyor device 13 is diagrammatically shown in FIG. 6. The construction of the conveyor device 13 according to this embodiment differs from the embodiment explained with reference to FIGS. 1–3 in that each receiver means 21, 22 is respectively provided with two vertically superposed receiver arms 25 and 26. These receiver arms are jointly movable and their vertical distance depends on the greatest diameter or profile cross-section of the rods 4 to be transported. In this embodiment, each receiver arm 25 or 26 is not only used as a conveyor device between the load crossbeam 10 and the roller path 14, but simultaneously serves as an intermediate storage between the shelves 2 and the roller path 14. With such a solution, delivery to the shelf handling device (gantry crane system 6) is not required during each material change, so that the usefulness of the roller path 14 and thus the speed of the cutting process for unmachined parts can be further increased. In response to the dimensions of the receiver arms 25, 26, the roller path 14 must have a correspondingly greater height so that the receiver arms 25, 26 pass under the horizontal roller bed 15.

FIGS. 7A-7I shows an example of a material changing cycle for the conveyor device 13 according to the embodiment shown in FIG. 6. In this case the two receiver arms 25 of the first receiver means 21 that are connected to form a unit exclusively serve the purpose of transporting remaining material away from the roller path 14 to the load crossbeam 10 (not shown in FIGS. 7A-7I), while the interconnected receiver arms 26 of the second receiver means 22 are provided for receiving rods 4 from the load crossbeam 10 and for supplying rods 4 to the roller path 14 and for depositing the same on the roller path 14.

Figure 7A:
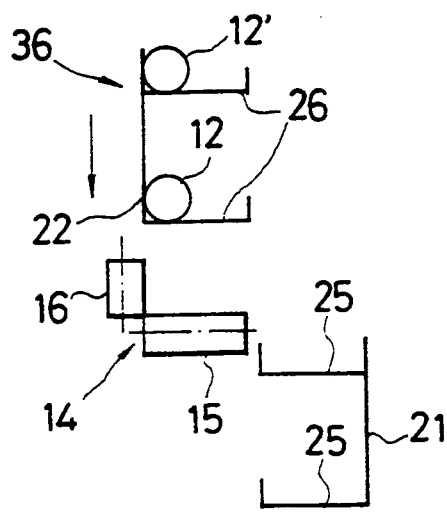
FIG. 7A–7I show a flow chart of a material changing operation for a conveyor device according to FIG. 6.

In FIG. 7A the receiver arms 26 are in their delivery position 36, respectively supporting first and second rods 12, 12' which were previously supplied by the load carrier 10 (not shown). At this time, the receiver arms 25 of the first receiver means 21 are positioned in their lower end positions and the whole conveyor device 13 is in its right end position corresponding to the position in FIGS. 1 and 2.

Figure 7D:
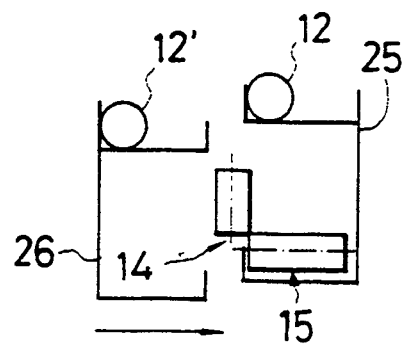
Figure 7B:
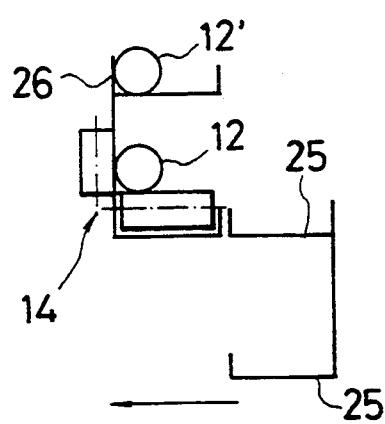

As shown in FIG. 7B, the rod 12 which rests on the lower receiver arm 26 is first deposited on the roller path 14 by vertically lowering the receiver arms 26. Subsequently, as shown in FIG. 7C, the whole conveyor device 13 is moved into its other horizontal end position, so that the upper one of the receiver arms 25 below the horizontal roller bed 15 is arranged for transporting the rod 12 as remaining material away from the roller path 14.

After the end of the operation for using the rod 12 and after the rod 12 has been lifted and received from the roller path 14 by the receiver arm 25, the arm 25 is moved vertically upwards either into an upper end position or into a position as shown in FIG. 7D in which the lower one of the receiver arms 25 remains below the horizontal roller bed 15. At the same time, receiver arms 26 of the second receiver means 22 are vertically lowered with the remaining rod 12' into the intermediate position laterally above the roller bed 16.

Figure 7E:
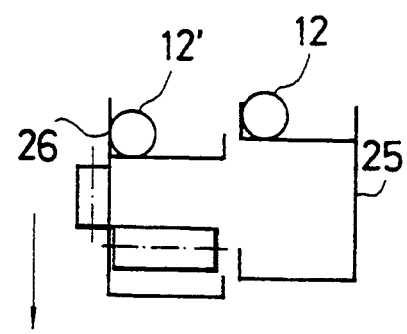
Figure 7C:
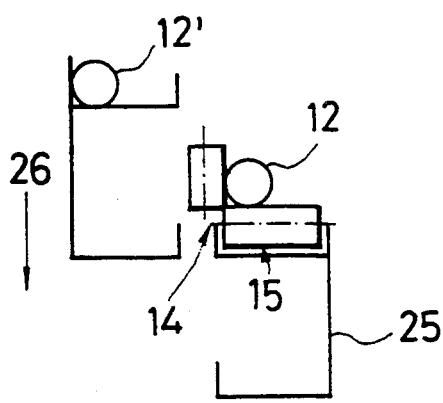
Figure 7F:
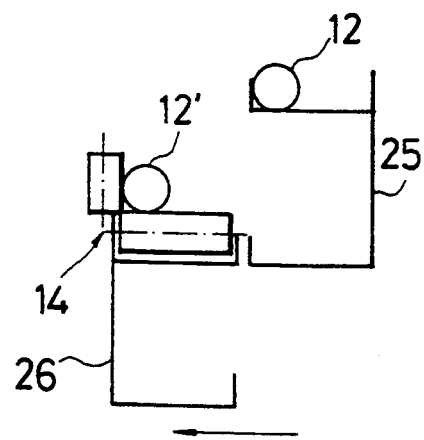

Subsequently, the whole conveyor device 13 is horizontally moved into its other right end position, as shown in FIG. 7E. The receiver arms 26 of the second receiver means 22 are then vertically lowered from this position further into their lower end position, so that the rod 12' positioned on the upper one of the receiver arms 26 is deposited onto the roller path 14 (FIG. 7F). Here, the receiver arms 25 of the first receiver means 21 remain in their positions such that the lower one of the receiver arms 25 is arranged in a position laterally below the horizontal roller bed 15.

Figure 7G:
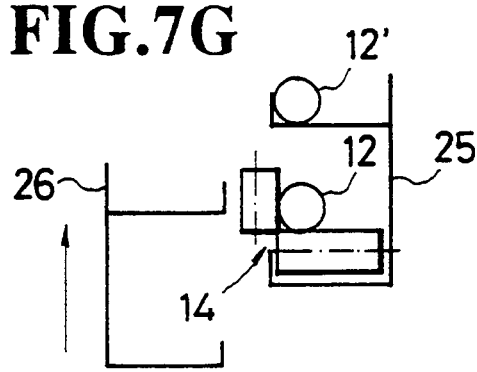
Figure 7H:
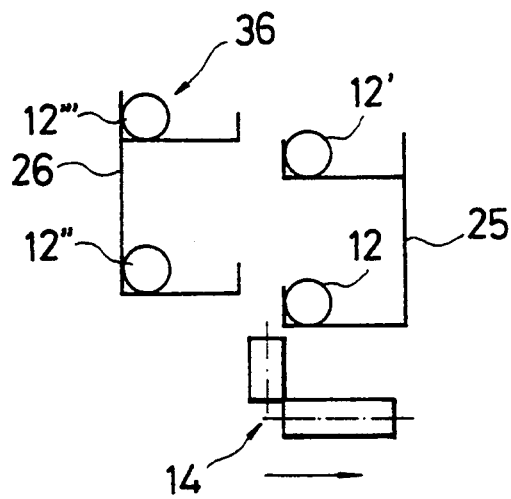

The whole conveyor device 13 is then moved again horizontally into its other left end position, so that the lower one of the receiver arms 25 passes under the horizontal rollers 15 (FIG. 7G). As shown in FIG. 7H, the receiver arms 26 of the second receiver device 22 is then moved upward into their upper end position forming the take-over position 36. At the same time, a vertical upwards movement of the receiver arms 25 is effected for discharging the rod 12 from the roller path 14.

Figure 7I:
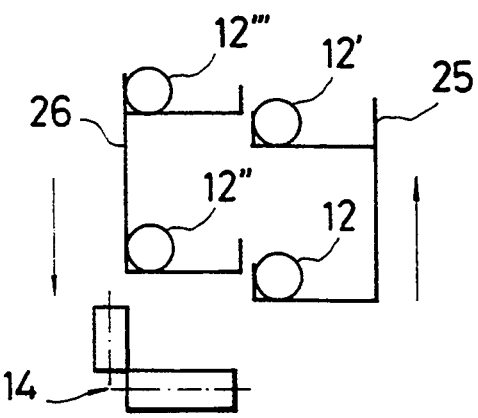

After that, the whole conveyor device 13 is again moved horizontally into its right end position, so that the two receiver arms 26 that received new rods 12'', 12''' move into a position vertically aligned with the roller path 14, as shown in FIG. 7I. Then, the receiver arms 25 with the remaining material of the rods 12 and 12' is moved upward into an upper delivery position for delivering the rods 12, 12' to the load crossbeam 10 (not shown).

The configuration of the conveyor device 13 in accordance with the second embodiment (FIG. 6) effects a greater independence of the conveyor device 13 with respect to the gantry crane system 6 and thus increased flexibility when the rods are supplied.

Figure 8:
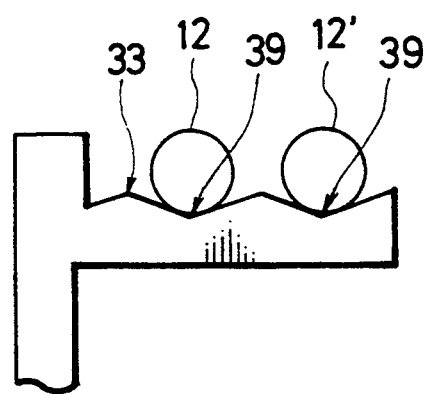
FIG. 8 shows a receiver arm according to another embodiment of the conveyor device where the receiver arm is used as an intermediate storage means with at least two rods being discretely arranged next to each other.

FIG. 8 is just a diagram of a receiver arm 25, 26 of one of the receiver means 21, 22. In comparison with the above-illustrated embodiments, this arm has a receiver trough of a greater width and is designed with a profile in such a way that in the direction of the width of the receiver arm discrete storing sections 39, which are for example formed by inclined planes, are provided for receiving at least two rods 12, 12' next to each other. In this way the conveyor device can be simultaneously used as an intermediate storage means. In the embodiment illustrated in FIG. 6 with at least two superposed receiver arms of each receiver means, the receiver arms may also optionally be provided with the storing sections 39 for receiving rods next to one another.

The first feature of the invention accomplishes a relatively robust conveyor device of simple construction which permits the supply and removal of rods to and from the roller path in conjunction with a shelf operating device while rods are simultaneously treated on the roller path, with idle and lost times being avoided during the removal of rods from a shelf store for delivery of the rods to a roller path. All functions regarding the removal of rods from the shelves, the delivery to the conveyor device and the deposition on the roller path as well as the return of the remaining material back into the shelves can be carried out in the conventional way automatically and in program-controlled fashion in response to a specific manufacturing task.

To ensure an independent movement of the receiver arms of each receiver device vertically and horizontally, it is of course possible to combine the horizontal and vertical adjustment movements of the receiver arms 25, 26 of each receiver means 21, 22 in a corresponding compound carriage. For instance, the guide supports 31, 32 may be made stationary and the transverse member 27, 28 may have a corresponding horizontally movable carriage guide on which the receiver arms 25, 26 are supported.

Now, with reference to FIGS. 9-14, a first embodiment of a gantry crane system according to the second feature of the present invention will be described hereinafter.

Figure 9:
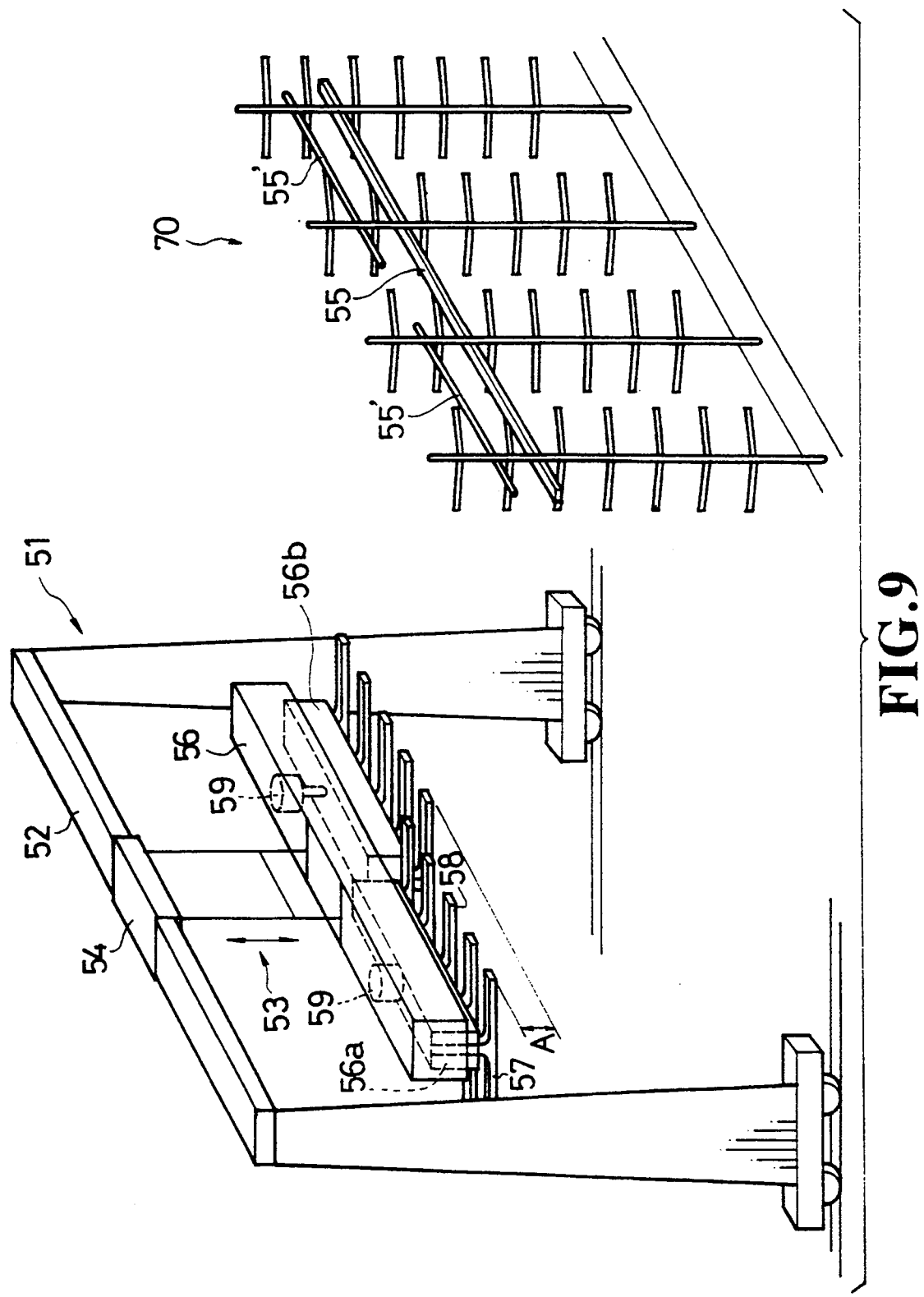
FIG. 9 shows a schematic representation of a first embodiment of a gantry crane system according to the second feature of the present invention.

FIG. 9 shows schematically a gantry crane system 51 which is generally similar to the gantry crane system 6 illustrated in FIG. 1. Namely, the gantry crane system 51 is movable along a cantilever-type store 70 in such a way that the crane bridge 52 of the gantry crane system 1 covers the store 70 for taking up bar material 55, 55'. According to this embodiment, the load crossbeam means 53 of the gantry crane system 51 has a crossbeam 56 which is vertically movable and includes two sub-crossbeams 56a, 56b in longitudinal direction (crossbeam width). The crossbeam 56 is represented here in enlarged fashion.

The crossbeam 56 can be moved by a carriage and or travelling means 54 along the crane bridge 52, but can also be stationarily fixed relative to the crane bridge 52. The crossbeam 56 or the subcrossbeams 56a, 56b have supporting arms 57, 58 as load take-up means at the lower side thereof. The supporting arms 57, 58 project laterally towards opposite sides like fork prongs so as to engage into the stock shelves of the store 70 to pick up bar material 55, 55' from the store 70 and place the same onto the store 70. The supporting arms 57, 58 can also engage into a delivery means to which the bar material 55, 55' is delivered after take-up from the store 70 or is taken up as remaining material therefrom (the conveyor device 13 shown in FIG. 1 is an example of the delivery means). The bar material 55, 55' is further placed onto or removed from a roller path extending within the cantilever-type store 70 for example, for feeding the material into a cutting-off machine (the roller path is indicated by 14 in FIG. 1).

The supporting arms 57, 58 of the crossbeam 56 are combined to and subdivided into respectively two groups by two subcrossbeams, in particular for the separate take-up of bar material pieces 55' deposited axially in substantially corresponding fashion in a stock shelf of the cantilever-type store 70.

As can be understood in greater detail in the following from FIGS. 10 to 13, the two subcrossbeams 56a, 56b are mounted movably independently of each other at least in vertical direction within the crossbeam 56. For example, hydraulic working cylinders 59 are provided between the crossbeam 56 and subcrossbeams 56a, 56b, for independent movements of the crossbeams 56a, 56b relative to each other.

It is possible in this fashion to move the crossbeam 56 with supporting arms 57, 58 at the same level, that is, in the same vertical position in a lower end position, for the subcrossbeams 56a, 56b to be Jointly below the bar materials 55' in a stock shelf of the cantilever-type store 70. Then, as for example illustrated in FIG. 9, one of the two subcrossbeams 56a, 85b which is located in the area of the bar material piece 55' to be removed subsequently can be only slightly lifted by actuating one of the working cylinders 59 within the stock shelf. A bar material piece 55' located in the area of the subcrossbeam, which is the front one 56a in FIG. 9, is taken up and conveyed out of the cantilever-type shelf.

As illustrated FIG. 9, a height level difference A between upper and lower end position of the subcrossbeams 56a, 56b can be adopted within the crossbeam 56 so that both shorter bar material pieces 55' can be individually removed from or deposited in a shelf half. Further, advantageous prerequistes are given for gripping of a distorted or bent bar material by the two subcrossbeams 56a, 56b, since a certain level correlation can take place between the supporting arms 57 or 58 of both subcrossbeams 56a, 56b.

The front subcrossbeam 56a is shown in FIG. 9 in a upper end position within the crossbeam 56 and the rear subcrossbeam 56b is shown in a lower end position within the crossbeam 56, the different height positions being represented in enlarged fashion. A measure of a few centimeters is actually preferred for the distance A (see also FIG. 13).

A bent, distorted material bar 55' can be aligned with each of the individual supporting arms 57, 58 in the vertical direction by an independent manipulation of the two subcrossbeams 56a, 56b or of further subdivisions of the subcrossbeams 56a, 56b (if the subcrossbeams are so subdivided). To transport the bent bar material, first of all, the material is only lifted at one end and subsequently slightly displaced horizontally so that the material bar is aligned with the crossbeam 56. After that, the material is taken from the stock shelf of the cantilever-type store 70 across its entire length using both subcrossbeams 56a, 56b.

Figure 10:
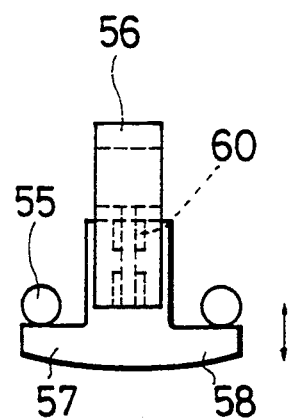
FIG. 10 shows a front view of the crossbeam according to FIG. 9.
Figure 11:
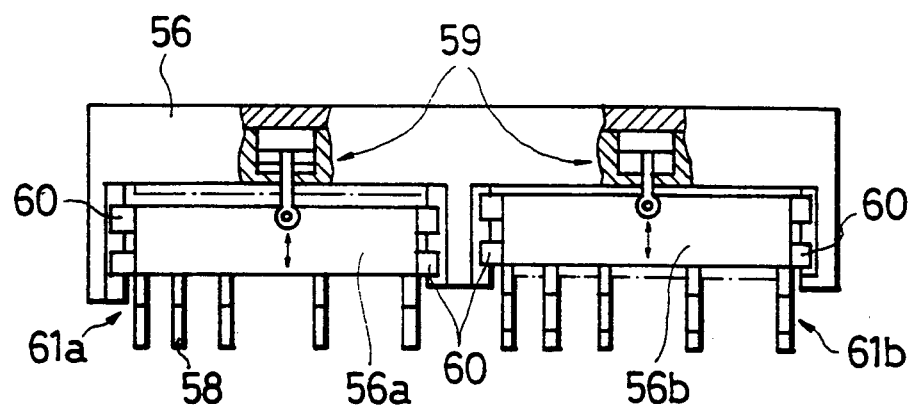
FIG. 11 shows a longitudinal sectional drawing of the load crossbeam according to FIGS. 9 and 10.
Figure 12:
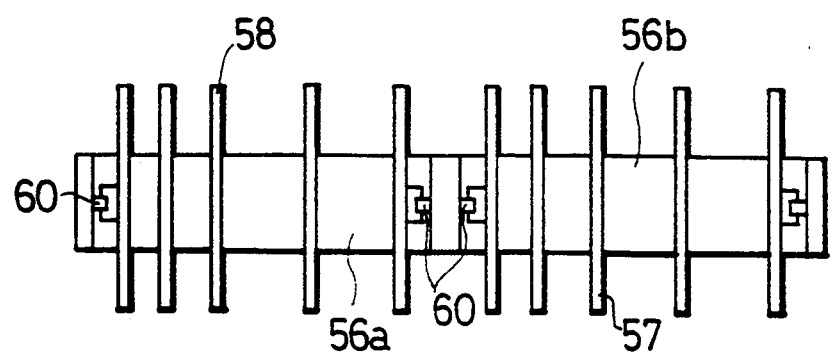
FIG. 12 shows a view from below of the load crossbeam according to FIGS. 9 and 10.

As schematically shown in FIGS. 10–12, linear guides 60 are in each case provided at the front and rear sides for the vertical guiding of each of the subcrossbeams 56a, 56b. The respective subcrossbeams 56a, 56b thus can be vertically moved within the crossbeam 56 along the guides. The subcrossbeam 56b illustrated by the dash-dotted line in FIG. 11 show the vertical position thereof in which the bent or distorted material can altogether be better picked up from or deposited in the cantilever-type store 70 by means of the crossbeam than has been the case so far.

Figure 13:
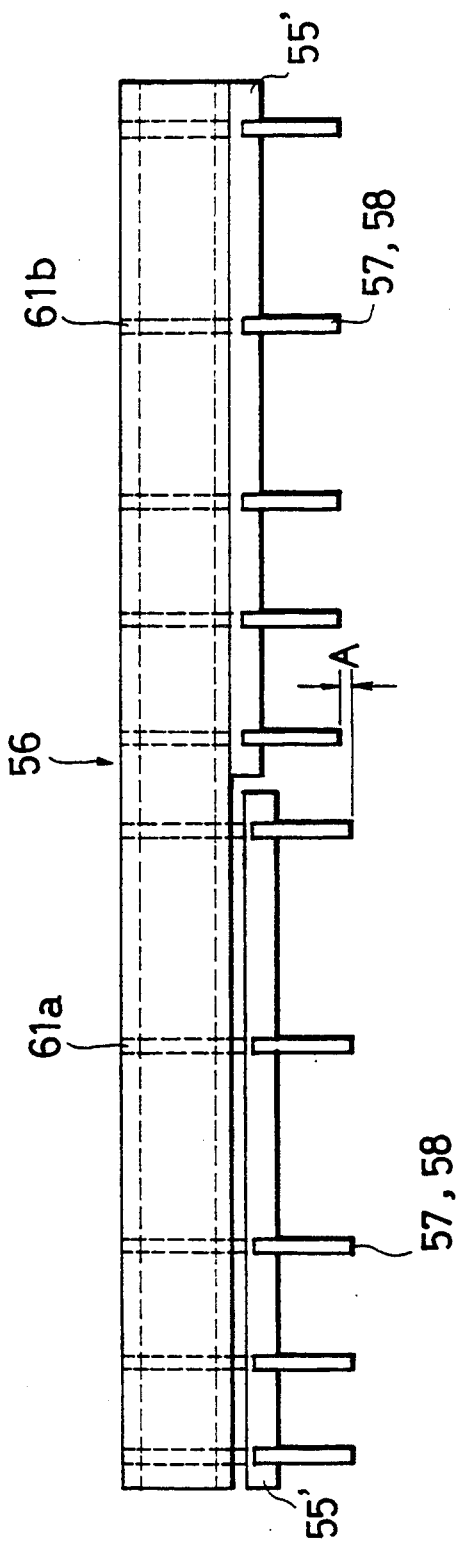
FIG. 13 shows the second embodiment of the crossbeam according to the second feature of the present Invention in a schematic lateral view.

FIG. 13 illustrates in a further example of embodiment a combination of the supporting arms 57 or 58 of the crossbeam 56 to subgroups 61a, 61b which are movable vertically independently of each other in order to separately handle two shorter bars of material 55'. Also here, carriage means not represented in detail are provided within the crossbeam 56, at which the supporting arm groups 61a and 61b are In each case combined and movable jointly in vertical direction.

In a further embodiment of the invention, further subdivision with respect to the supporting arm groups can also be effected so that individual or all supporting arms 57, 58 can be moved individually at least vertically by a certain measure independently of each other in each case by an individual drive.

In the above embodiment with a crossbeam 56 in which the subcrossbeams 56a, 56b are individually vertically movable, the crossbeam 56 is disposed within the gantry crane bridge system 51 either stationarily or movably like a carriage along the crane bridge 52. The present invention is of course not restricted to such an embodiment. That is to say, a crane bridge 52 can also be completely dispensed with and the crossbeam 56 can be mounted directly with its front-side ends in the movable lateral portal supports of the gantry crane system 51 and moved vertically upwardly and downwardly. Moreover, the crossbeam 56 may also be directly guided in the lateral portal supports of the gantry crane system 51 by means of lateral guides at the front side, while traction means engage at the ends of the crossbeam 56 in order to suspend it vertically adjustably from the crane bridge 52 although such developments are not represented in the present drawings.

Moreover, the embodiments according to FIGS. 10 to 13 can also be modified in such a way that, in addition to the linear guides 60 which form vertical guides, horizontal guides are provided so that a certain measure of horizontal relative movement between the subcrossbeams 56a and 66b is possible for the lifting or better gripping of the bar material 55 without having to move the total crane system in every case.

Figure 14:
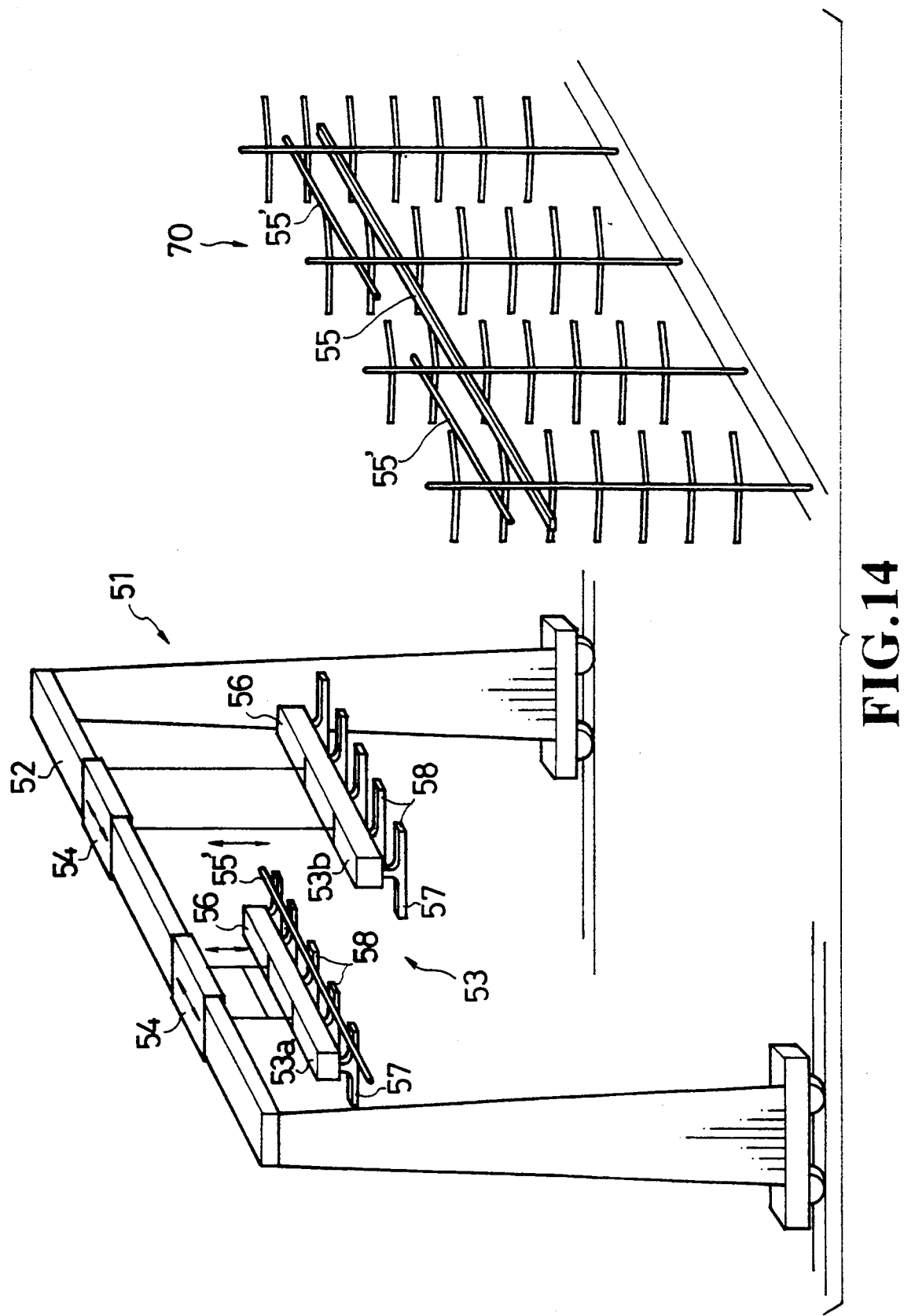
FIG. 14 shows a schematic representation of a second embodiment of the gantry crane system according to the second feature of the present invention.

Further, the present invention is not restricted to the use of a single crossbeam means 53 with subdividing subcrossbeams 56a, 56b. As illustrated in FIG. 14, the subcrossbeam means 53a, 53b can also be formed by separate cross-beams 56 subdividing the crane bridge 52. The separate crossbeams 56 are movable vertically and horizontally independently from each other. The crossbeams 56 are moved horizontally by a carriage or travelling means 54 in a front and rear area of the crane bridge 2.

In this embodiment, the width of the cantilever-type store 70 of for example 6 meters can also be subdivided into a front and a rear area of 3 meters each, which can then be served by the front or rear subcrossbeam means 53a or 53b each including the crossbeam 56. It is possible in this embodiment to take out within a time shorter than before bar material pieces which are located in a front or rear area of the cantilever-type store 70. The bar material taken out from the store 70 may be placed onto the roller path extending within the cantilever-type store 70 for feeding a bar material to a cutting-off machine or removing the same from it.

Moreover, the subdivision of the crane bridge 52 for guiding two subcrossbeam means 53a, 53b also permit a good handling of distorted bar material or bent bars of material which is preferably handled by both subcrossbeam means 53a, 53b at the same time since the bar material extends across the entire shelf width. That is to say, due to their individual controllabillty it is possible to operate the load crossbeam means 53a, 53b in vertical positions differing slightly from each other in order to take material bendings into consideration. It is also possible to first of all slightly lift the bar material 55 located in a stock shelf at one side by means of one of the subcrossbeams 53a 53b and then engage under it with the other subcrossbeam means 53a or 53b and to pick it up from the cantilever-type store 70 with both subcrossbeam means 53a, 53b or to place the bar material 55 into it in reverse order. Moreover, the removal or returning of shorter bar material 55' is possible advantageously. Thus, this embodiment illustrated in FIG. 14 achieve the same handling properties and advantages which are also inherent to the embodiments according to FIGS. 9 to 13 with the subcrossbeams 56a, 56b that can be positioned at different vertical levels, or with the individual supporting arm groups 61a, 61b of the crossbeam 56.

In FIG. 14, the subcrossbeam means 53a, 53b includes a load crossbeam 56, each carrying supporting arms 57, 58 as load take-up means at the lower end thereof. The supporting arms 57, 58 project again to opposite sides like fork prongs. Thus, the supporting arms 57, 58 can engage into the stock shelves of the cantilever-type shelf 70 and also into delivery means (such as the conveyor device 13 in FIG. 1) to which the bar material 55 is delivered or from which it is picked up again as remaining material. If required, the load crossbeams 6 can also cooperate directly with a feed means (such as the roller path 14 in FIG. 1) feeding the bar material to a cutting-off machine for delivery or take-up of the bar material 55.

Moreover, the subdivision of the crane bridge 52 permits not only the advantageous take-up of distorted or bent bar material, but also the separate take-up of relatively short bar material 55 that is stored in substantially axial alignment in a stock shelf of the cantilever-type store 70.

Each load crossbeam 56 of the load crossbeam means 53a, 53b according to the embodiment illustrated in FIG. 14 can be further designed in such a way as described above for the load crossbeam 56 in FIGS. 9 to 13 so that a further vertical separate guiding of the supporting arms 57 and 58 and their combination to groups can also be effected within each load crossbeam 56. That is to say, each crossbeam 56 can have subcrossbeams 56a, 56b movable vertically guided relative to each other as described above.

We claim

1. A conveyor device for feeding rods into a working machine such as a cutting-off machine, and in particular for supplying and discharging rods to and from a roller path for feeding the rods into the working machine, the conveyor device comprising receiver means arranged at both sides of said roller path for conveying said rods between a handling device of a stock of rods and said roller path, each of said receiver means (21, 22) comprising at least one receiver arm, (25, 26) which is independently movable substantially vertically, a vertical guide means (23, 24) for said receiver arms (25, 26), and a basic frame (35) which accommodates said vertical guide means (23, 24) and is horizontally displaceable in a direction transverse to a longitudinal direction of the roller path.

2. A conveyor device according to claim 1, characterized in that said receiver arm (25, 26) is substantially parallel with the running direction of said roller path (14) and is formed of a plurality of spaced-apart supporting members, and said receiver arm (25, 26) is secured to a transverse member (27, 28( which is supported in a vertically displaceable way by said vertical guide means (23, 24), in such a way that the arm (25, 26) projects substantially laterally toward said roller path (14).

3. A conveyor device according to claim 1, characterized in that said roller path (14) has at least one roller bed (15) which extends substantially in horizontal direction and includes spaced-apart transport rollers (17), and said receiver arm (25, 26) of each receiver means (21, 22) is selectively movable into positions above or below said roller bed (15), with supporting members of said receiver arm (25, 26) being vertically passed between spaced-apart conveyor rollers (17) of said roller bed (15).

4. A conveyor device according to claim 1, characterized in that said roller path (14) has an inclined, substantially horizontal roller bed (15) and an inclined, substantially vertical roller bed (16) for longitudinally conveying rods (4) which are positioned on said roller path (14).

5. A conveyor device according to claim 1, characterized in that a take-over/delivery position (36) of said receiver arms (25, 25) of said two receiver means (21, 22) which is located above said roller path (14) is provided for taking rods (4) over and delivering rods (4) to a handling device (6, 10).

6. A conveyor device according to claim 5, characterized by the arrangement of said conveyor device (13) within a cantilever-type store (1) with the handling device (6, 10) whose load crossbeam (10) is movable into said take-over/delivery position (36) of said receiver arms (25, 26) of said receiver means (21, 22) for transferring rods (4) from shelves (2) of said cantilever-type store (1) to said receiver means (21, 22) and for transferring rods (4) from said receiver means (21, 22) to said shelves (2).

7. A conveyor device according to claim 1, characterized in that said transverse member (27, 28) of said receiver means (21, 22) carry a plurality of vertically spaced-apart receive arms (25, 26).

8. A conveyor device according to claim 1, characterized in that said supporting members of each receiver arm (25, 26) have a receiver trough (33) for depositing said rods (4).

9. A conveyor device according to claim 8, characterized in that said receiver troughs (33) have an inclined bottom surface defined by substantially vertical edge projections (34) of different height.

10. A conveyor device according to claim 8, characterized in that said receiver trough (33) of said supporting members of at least one receiver arm (25, 26) have discrete storing sections (39) for storing a plurality of rods (12, 12') of said stock of rods (4) next to one another.

11. A conveyor device according to claim 1, characterized in that at least one of said receiver arms (25, 26) forms an intermediate storage device for said rods (4).

12. The conveyor device of claim 1 further comprising a rail provided on a floor and extending along the axis transverse to the longitudinal axis of the roller path, the basic frame being movable along the rail.

13. A conveyor device for feeding rods into a working machine such as a cutting-off machine, and in particular for supplying and discharging rods to and from a roller path (14) for feeding the rods into the working machine, the conveyor device comprising receiver means arranged at both sides of said roller path for conveying said rods between a handling device of a stock of rods and said roller path, each of said receiver means (21, 22) comprising at least one receiver arm, (25, 26) which is independently movable substantially vertically, said receiver means (21, 22) arranged at both sides of said roller path and disposed on a common basic frame (35) which is horizontally displaceable below said roller path and in a direction transverse to a conveying direction of the roller path.

14. The conveyor device of claim 13 further comprising a rail provided on a floor and extending along the axis transverse to the longitudinal axis of the roller path, the basic frame being movable along the rail.

15. A conveyor device for feeding rods into a working machine, comprising:
a roller path for feeding the rods into the working machine along its longitudinal axis;
a first vertical guide provided on a first side of the roller path;
a first receiver arm slidably mounted on the first vertical guide, in such a way as to project substantially horizontally toward the roller path;
a second vertical guide provided on a second side of the roller path;
a second receiver arm slidably mounted on the second vertical guide, in such a way as to project substantially horizontally toward the roller path;
wherein the first and second vertical guides are movable along an axis transverse to the longitudinal axis of the roller path.

16. A conveyor device for feeding rods into a working machine in cooperation with a roller path which feeds the rods into the working machine along its longitudinal axis, the conveyor device comprising:
a first vertical guide adapted to be provided on a first side of the roller path;
a first receiver arm slidably mounted on the first vertical guide, in such a way as to project substantially horizontally toward the roller path;
a second vertical guide adapted to be provided on a second side of the roller path;
a second receiver arm slidably mounted on the second vertical guide, in such a way as to project substantially horizontally toward the roller path;
wherein the first and second vertical guides are movable along an axis transverse to the longitudinal axis of the roller path.

17. The conveyor device of claim 16, wherein working machine is a cutting-off machine.

18. The conveyor device of claim 17, wherein each of the first and second receiver arms are movable between a first position higher than the height of the roller path, and a second position lower than the height of the roller path.

19. A conveyor device for feeding rods into a working machine in cooperation with a roller path and handling device, wherein the roller path feeds the rods into the working machine along its longitudinal axis, and the handling device transfers rods between shelves for storing rods and the conveyor device, the conveyor device comprising:
a first vertical guide adapted to be provided on a first side of the roller path;
a first receiver arm slidably mounted on the first vertical guide, in such a way as to project substantially horizontally toward the roller path;
a second vertical guide adapted to be provided on a second side of the roller path;
a second receiver arm slidably mounted on the second vertical guide, in such a way as to project substantially horizontally toward the roller path;
wherein the first and second vertical guides are movable along an axis transverse to the longitudinal axis of the roller path.

20. The conveyor device of claim 19, wherein the first and the second vertical guides are mounted on a basic frame that is movable along an axis transverse to the longitudinal axis of the roller path.

* * * * *